Patented Apr. 20, 1954

2,676,165

UNITED STATES PATENT OFFICE 2,676,165

POLYSULFIDE POLYMERS

Edward M. Fettes, Trenton, N. J., assignor, by mesne assignments, to Reconstruction Finance Corporation, Philadelphia, Pa., a corporation of the United States No Drawing. Application May 10, 1951, Serial No. 225,661

5 Claims. (Cl. 260—79.1)

This invention relates to polysulfide polymers and more particularly to a process whereby certain known polysulfide compounds can be converted into polysulfide polymers characterized by the fact that they have a predetermined and controllable number of monomeric units. The products of the invention may include certain non-sulfur-containing reactive groups which, when present, confer upon the products various new and useful properties outlined hereafter. The present application is a continuation-in-part of my prior application Serial No. 771,149 filed August 28, 1947, now abandoned.

Polysulfide polymers and copolymers may be either linear, partially cross-linked or completely cross-linked. The linear compounds are characterized by recurring units SRS and may be symbolized by the formula $H(SRS)_x(SR'S)_yH$. In this formula R and R' are radicals having a skeleton carbon structure selected from the group consisting of

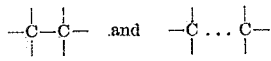

designating respectively adjacent carbon atoms and carbon atoms joined to and separated by intervening structure. $x$ and $y$ are integers indicating the number of the respective units and the ratio of those integers determines the proportion of those units in the copolymers. Where $x$ or $y=0$ the result is a homopolymer. The cross-linked polymers are characterized by the recurring units

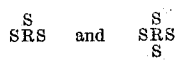

wherein R may have the same structure as indicated for the linear polymers.

The polysulfide polymers may be divided broadly into two classes (a) the normally solid polymers having molecular weights as high as say 100,000 to 200,000 and (b) polymers which can be obtained by splitting those high polymers into lower polymers. The splitting may be effected i. e. in accordance with the disclosure of U. S. Patent 2,466,963 to Patrick and Ferguson. In class (b) are the polymers normally, i. e. at 25° C., existing as flowable liquids and having molecular weights ranging from those of dimers up to about 15,000.

Both classes are widely use. The high polymers as such or in the form of solutions in organic solvents or dispersions in water may be used for such purposes as binders for transmission belts, linings for propane and butane gas hose, hose for paint spray equipment, high pressure grease-gun hose, linings for hose to convey gasoline, oil, etc., pump pistons and cups in oil slush pumps, protective jackets for high tension wires and portable cables, printing rollers and blankets for newspaper printing, gaskets, washers, packing in all industries, covers for conveyor belting, balloon fabric, diaphragms for controllers, regulators and meters, binders and adhesives for use with leather, cork and felts, seals for prevention of refrigerant leakage, gloves for chemical plants and paint factories, printing plates for use with inks, paints, etc., packings for compressors, many specialty molded products, protective liners and lining means for tanks, etc., such as those used in refineries and in dry cleaning equipment, and numerous other uses.

In connection with many of the foregoing uses, in order to develop properties such as strength, solvent resistance, etc., to the highest degree curing is necessary. For that purpose metallic oxides, especially zinc oxide, are commonly used.

The liquid polymers are also extensively used, the uses including protective coatings, impregnants, adhesives, caulking, binders, flexibilizers, printer's rolls, poured gaskets and joint sealers. There also, curing is employed to transform the liquid polymers to the solid condition, harden them and develop the properties of strength, solvent resistance, etc., to the desired degree. Oxidation is one step used for that purpose, various oxidizing agents including metallic peroxides being employed.

Objects of the invention include the following:

a. To introduce new functional groups into the polymers e. g. hydroxyl, carboxyl and amino groups.

b. To change the degree of polymerization of a polymer to any desired extent, i. e. to increase or decrease it. For example a normally solid high polymer may be softened or converted to a normally liquid polymer or to a monomer.

c. To produce new classes and species of organic chemicals useful as such or as intermediates for conversion into other useful products.

The following examples will illustrate the utility of the invention.

The high polymers are usually cured by heating with metallic oxides. For some purposes the electrical properties e. g. the dielectric constant, of the cured product or vulcanizate are impaired by the presence of metallic oxides therein. By introducing new groups a different type of curing can be effected. For example by introducing hydroxyl groups or carboxyl groups curing can be effected by heating with polycarboxylic acids or polyhydric alcohols respectively and thus a cured product can be produced free from metal oxides and having a relatively high dielectric constant.

It is frequently desirable to soften a high polymer to facilitate processing, or to convert it to a liquid polymer to secure the advantages of liquid over solid polymers.

The known liquid polysulfide polymers are polymercapto compounds and their uses are limited by the presence of mercapto groups. The present invention makes it possible to replace those SH groups with other functional groups such as hydroxyl, carboxyl, nitrile, nitro, amino, carbonyl and aldehyde and thus new classes and species of organic chemicals or intermediates are obtained. They may be used as such as plasticizers, oil additives, fungicides and insecticides and for other applications. They may also be converted into other new and useful products including new resins, elastomers and plastics. The hydroxyl compounds constitute new glycols or polyhydric alcohols which produce new resins by reaction with polycarboxylic acids. The carboxyl derivatives when reacted with glycols or polyhydric alcohols also produce new resins. The amino derivatives when reacted with dibasic acids, acid chlorides or anhydrides produce new polyamide plastics useful in making filaments.

Liquid polymers produced in accordance with the present process are particularly useful for those applications where a polysulfide polymer is desired that is free from mercapto groups and has a fluidity falling within a relatively narrow predetermined range. In the manufacture of electrical transformers, for example, so called "potting compounds" are used to coat the windings and in order to secure desired penetration by the coating composition a controllable fluidity is required. Liquid polymers can be prepared by the present method that have hydroxyl terminals and the desired fluidity, and these polymers can be mixed with, for example, adipic acid, applied to the transformer windings, and the coating baked to convert the mixture to a solid layer having desirable protective properties.

Other applications wherein freedom from mercapto groups combined with precise fluidity control are important include liquids used in fluid drives for mechanical members, and oil additives to reduce oxidation and increase the lubricity of lubricating oils.

In general the process of the present invention involves treating a polysulfide compound e. g. a linear polymeric dimercaptan having the formula $H(SRS)_pH$ with a monomeric polysulfide having the formula $R'SSR'$. In these formulae R is a radical selected from the groups

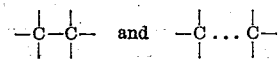

designating, respectively adjacent carbon atoms and carbon atoms connected to and separated by intervening structure; R' is a monovalent organic radical of the type listed in Table I below; $p$ is a positive integer which may vary from say 1 to 1000 or even higher; and SS is a disulfide linkage.

The reaction between the polymeric dimercaptan and the monomeric disulfide is preferably carried out by maintaining a mixture of these materials at a temperature of 25° C. to 250° C. until equilibrium has been attained and then oxidizing the reaction product to convert all mercapto groups to disulfide linkages. The molecular size of the product is controlled by controlling the number of SRS groups in the product and that is controlled by following the rule that the mol ratio of the organic monomeric disulfide $R'SSR'$ to the SRS unit in the dimercapto compound $H(SRS)_pH$ is $1/n$ where $n$ is the desired average number of SRS units in the product. The product will have the general formula $R'S(SRS)_nSR'$.

Assume for example that one starts with a polymeric dimercaptan having the formula (a) $H(SC_2H_4S)_{30}H$ where $p=30$ and that it is desired to convert it into a product having the formula (b) $HOC_2H_4S(SC_2H_4S)_{20}SC_2H_4OH$ in other words suppose one wishes to provide product (a) with hydroxyl terminals and to change the molecular size so that there are 20 $(SC_2H_4S)$ units in the molecule instead of 30.

According to the invention product (a) is reacted at temperatures of 25° C. to 250° C. with $\frac{1}{20}$ of a mole of dihydroxydiethyl disulfide $$HOC_2H_4SSC_2H_4OH$$

and the amount of product (a) so reacted is equal to the unit molecular weight of the radical $$SC_2H_4S$$

i. e. 92 grams of product (a) is so reacted. The reaction product is then oxidized to convert all —SH groups into —SS— linkages.

The same result can be obtained by starting with one gram mol of dimercaptoethane $$HSC_2H_4SH$$

which contains 92 grams of the unit $SC_2H_4S$ and reacting it with $\frac{1}{20}$ of a gram mol of dihydroxydiethyl disulfide, i. e. product (b) is thereby produced.

In other words the number of —SRS— groups in the product is controlled by the mol ratio of the organic monomeric disulfide to the SRS unit of the dimercaptan. That number of —SRS— groups may be any desired number e. g. from 1 to 1000, designated as "$n$." If the mol ratio of the monomeric disulfide to the SRS unit of the dimercaptan be fixed at $1/n$, the product will have $n$ SRS groups regardless of the number of SRS units in the dimercaptan selected as starting material.

Reference will now be made to mercapto compounds characterized by the structural units $$\overset{S}{SRS} \quad \text{and} \quad \overset{S}{\underset{S}{SRS}}$$

which are designated hereafter $RS_3$ and $RS_4$ respectively. Such compounds include the monomeric polymercapto compounds containing three or four —SH groups and condensation products thereof characterized by the above mentioned structural units.

Consider for example a polymercapto compound having the general formula:

$$(RS_3)_pH_{p+2}$$

where $p$ varies from 1 to 1000. That compound is reacted with an organic monomeric disulfide according to the procedure and principles above explained. The size of the product is controlled by controlling the number of $RS_3$ units therein and that is controlled by observing the rule that the mol ratio of the organic monomeric disulfide to the $RS_3$ unit is $$\frac{n+2}{2n}$$

where $n$ is the desired number of $RS_3$ units in the product.

In reacting polymercapto compounds characterized by the structural unit $RS_4$, the number of such units in the product is controlled by observing the rule that the mol ratio of the organic monomeric disulfide to the molecular weight of said unit is $$\frac{n+1}{n}$$

where $n$ is the number of desired $RS_4$ units in the product.

In dealing with compounds characterized, respectively by the units $RS_2$, $RS_3$ and $RS_4$ the general rule for controlling the number of said units in the product is to employ a mol ratio of the organic monomeric disulfide to the molecular weight of said unit determined by the ratio $$\frac{n(q-2)+2}{2n} \quad (1)$$

where $q$ is the number of sulfur atoms in said unit and $n$ is the number of said units desired in the product.

The general formula of the product is $$(RS_q)_n(SR')_{n(q-2)+2} \quad (2)$$

Where $q=2$ Formula 1 above becomes $$\frac{1}{n}$$

and Formula 2 becomes $(RS_2)_n(RS')_2$

Where $q=3$ Formula 1 above becomes $$\frac{n+2}{2n}$$

and Formula 2 becomes $(RS_3)_n(SR')_{n+2}$

Where $q=4$ Formula 1 above becomes $$\frac{2n+2}{2n} \text{ or } \frac{n+1}{n}$$

and Formula 2 becomes $(RS_4)_n(SR')_{2n+2}$

Assume for example that one starts with a polymeric polymercaptan having ten $RS_3$ units and thus twelve —SH groups and having the formula (a) 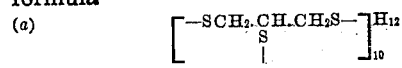

and that it is desired to convert it into a product having the formula (b) 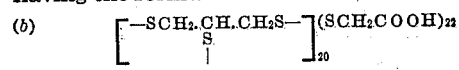

According to the invention product (a) is reacted at temperatures of 25° C. to 250° C. with $$\frac{n+2}{2n} = 22/40 = 11/20$$

of a mol of dithiodiglycollic acid and the amount of product (a) so reacted is equal to the unit molecular weight of the radical $RS_3$ i. e. 137 grams of product (a) is reacted. The reaction product is then oxidized to convert all —SH groups into —SS linkages.

The generality of organic monomeric disulfides that may be used will be clear by reference to the following Table I showing numerous specific illustrations.

Table I (a) $OH.C_2H_4SSC_2H_4.OH$
(b) $HOOC.CH_2SSCH_2.COOH$
(c) $CH_2=CH.CHOH.CH_2SSCH_2.CHOH.CH=CH_2$
(d) 

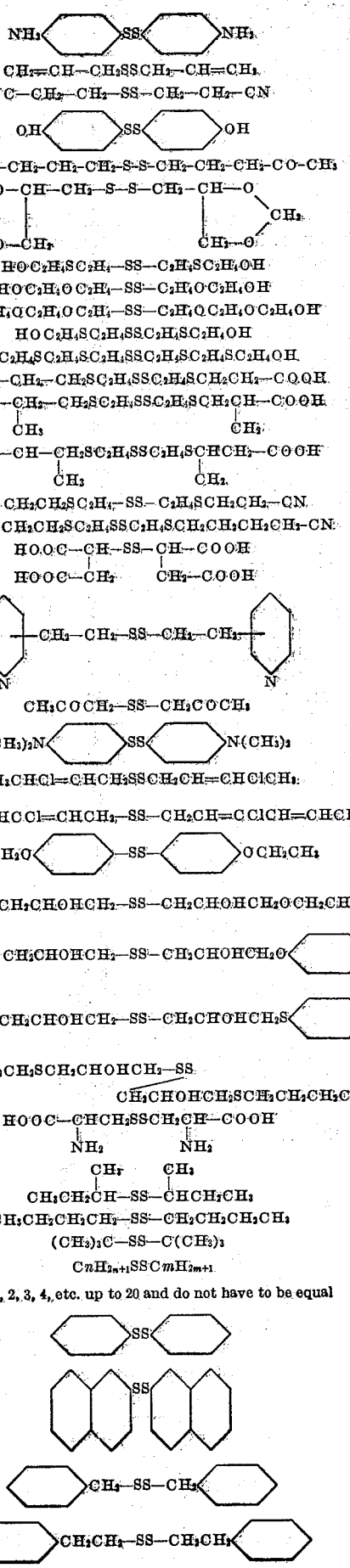

All the substances in Table I have the general formula R'SSR'. In accordance with the invention the H atoms of the mercapto groups of the mercapto compounds are replaced with an R' radical. The functionality of those R' radicals, as will be seen, is subject to a great deal of diversification. Thus the invention provides for the endowment of polymercapto compounds with a wide diversity of functionality and, therefore, utility.

It may be noted that the R' radicals of the substances listed in Table I may or may not contain sulfur, but where they do contain sulfur the sulfur atom is spaced from the disulfide linkage. In other words the substances of Table I are monomeric disulfides wherein (a) both sulfur atoms of the disulfide linkage are connected to carbon atoms and (b) each of the carbon atoms connected to the disulfide linkage is otherwise connected only to atoms of the group consisting of carbon and hydrogen.

The monomeric organic disulfide R'SSR' may be produced by any suitable method. One general method is the reaction of the corresponding R'Cl compound with an alkaline disulfide e. g. Na₂S₂. Thus compound (a) above, di (hydroxyethyl) disulfide, may be prepared by reacting ethylene chlorhydrin with sodium disulfide; compound (b) dithiodiglycolic acid may be prepared by reacting sodium disulfide with monochloracetic acid; compound (c) di(2 vinyl 2 hydroxyethyl) disulfide may be prepared by reacting 1-chloro-2-hydroxy butene-3 (butadiene chlorhydrin) with sodium disulfide; compound (d) di(paranitro phenyl) disulfide may be prepared by reacting paranitro chlorbenzene with sodium disulfide; compound (e) di(para aminophenyl) disulfide may be prepared by reducing compound (d) to produce para aminophenyl mercaptan and oxidizing the latter to condense these groups while protecting the NH₂ groups; compound (f) may be obtained by reacting allyl chloride with an alkaline disulfide; compound (g) may be obtained by reacting potassium cyanide with di(chloroethyl) disulfide; compound (h) may be obtained by reacting phenol with S₂Cl₂; compound (i) may be obtained by reacting an alkaline disulfide with gammachloropropyl methyl ketone; compound (j) may be obtained by condensing formaldehyde with glycerine monochlorhydrin (1 chlor-2, 3 dihydroxy propane) and reacting the product with an alkaline disulfide.

Specific illustrations of dimercaptans having the above mentioned general formula H(SRS)ₚH are shown in the following Table II.

Table II

H(S—CH₂CH₂—S)pH
H(S—CH₂CH₂CH₂—S)pH
H(S—(CH₂)₅—S)pH
H(S—CH₂CH₂O CH₂CH₂—S)pH
H(S—CH₂CH₂O CH₂O CH₂CH₂—S)pH
H(S—CH₂CH₂O CH₂CH₂O CH₂CH₂S)pH
H(S—CH₂CH₂SCH₂CH₂—S)pH
H(S—CH₂CHOHCH₂—S)pH
H(S—CH₂—CH—S)pH
            |
           CH₃

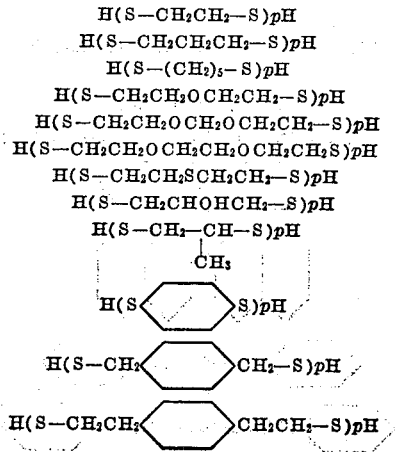

H(S—CH₂CH₂O—COCH₂CH₂COOCH₂CH₂—S)pH
H(S—CH₂CO—OCH₂CH₂O—COCH₂—S)pH

In the above list p varies from 1 to 1000. When p equals 1 the resulting monomeric dimercaptans can be prepared by the standard reactions of organic synthesis for example, treatment of the corresponding halides with an alcoholic solution of sodium sulfhydrate. They can also be prepared by reaction of the halide with sodium polysulfide.

Table III

List of tri-mercapto compounds:

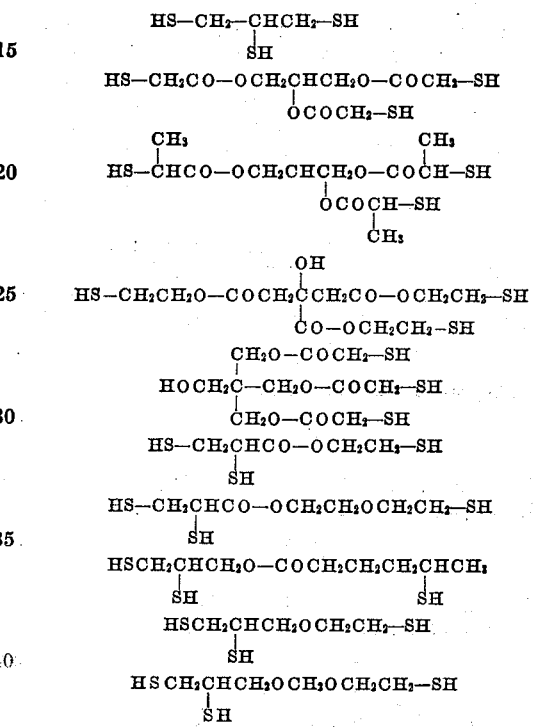

Table IV

List of tetra-mercapto compounds:

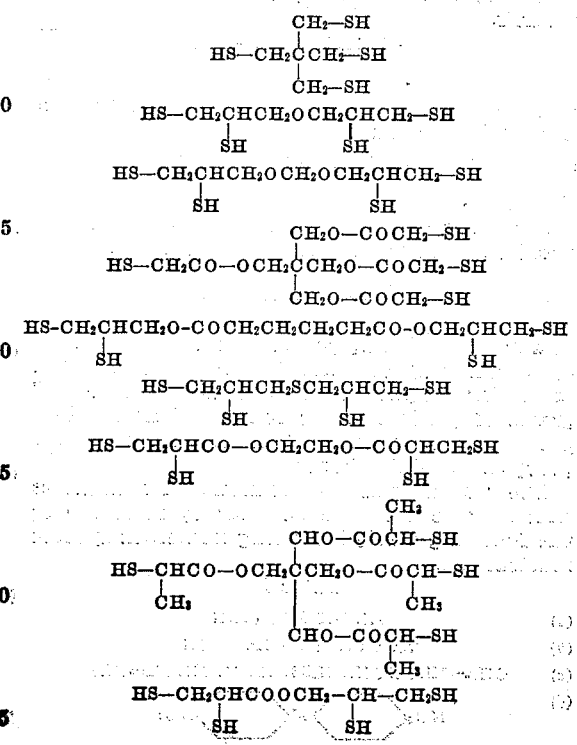

Polymeric products of the substances shown in Tables III and IV may be used. The polymeric dimercaptans (where $p$ equals 2 to 1000) can be prepared by a controlled partial oxidation of the monomeric dimercaptans or preferably by a controlled splitting of polysulfide polymers as illustrated in Processes A and B below. All of the polymercapto compounds of the invention are characterized by the repeating unit $RS_q$ (where $q$ is 2, 3 or 4) and the general formula of said compounds is

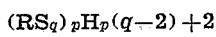

$$(RS_q)_p H_p(q-2)+2$$

where $p$ varies from 1 to 1000.

Any of various oxidizing agents can be used in carrying out the oxidizing step of the present process. Oxidizing agents capable of oxidizing monomercaptans to produce disulfides without further oxidation of the disulfide links are, per se, known. See for example, Gilman "Organic Chemistry" Chap. 10, "Organic Sulfur Compounds" by Ralph Connor, vol. 1, p. 851, 861, and Ellis "The Chemistry of Petroleum Derivatives," vol. 1, p. 433. Such oxidizing agents are suitable for oxidizing mercapto groups according to the present invention and are illustrated by materials such as iodine, alkali catalyzed gaseous oxygen, ferric chloride, lead peroxide, dilute hydrogen peroxide, sulfur, alkali and alkaline earth polysulfides, hypohalides, sodium plumbite and sulfur, cupric salts, ferricyanides, peroxides, and hydroperoxides.

In order to define accurately illustrative polymercapto polysulfides that can be used as starting materials in the present process, two examples of processes of making such starting materials are given below and designated Process A and Process B.

*Process A*

To 8.4 lb. mols of sodium polysulfide of rank of 2.25 dissolved in 540 gallons of water, there are added 48 pounds of crystallized magnesium chloride and 15 pounds of flake caustic soda. The mixture is preferably heated to 185° F. and to it are added 8 lb. mols of dichlorodiethyl formal. The organic halide is added slowly so that a period of about one hour is consumed. During this feed the heat of reaction is used to carry the temperature up to 210° F. During this time the reacting polysulfide mixture is kept under continuous and efficient agitation to produce a highly dispersed latex-like reaction product. At the end of the halide feed the reaction mixture is held for 20 minutes at 212° F. The latex is washed free from soluble salts by washing with water and intermittent decantation. In order to produce a satisfactory degree or state of high polymerization in the latex just described, it is desirable to employ an after treatment which comprises heating the latex in presence of 2 lb. mols of disulfide of sodium in the form of a 2-molar solution of that salt. The polysulfide in polymer dispersion is then heated 30 minutes at a temperature of 185° F. after which the excess polysulfide is removed by washing and decanting. The latex is again washed twice to remove most of the soluble salts. The molecular weight of the polymer at this point is high, i. e., of the order of 100,000 to 200,000.

The high polymer is then "split" or disarticulated by treatment of the latex with 0.8 lb. mol of sodium hydrosulfide (NaSH) and 4.4 lb. mols of sodium sulfite (Na₂SO₃). The latex is heated with agitation in the presence of these splitting salts for 60 minutes at 180° F. The latex is washed until substantially free from soluble materials. It is then caused to coagulate by the addition of an amount of acid which will produce a hydrogen ion concentration corresponding to about a pH between 4 and 5. The agglomerated polymer produced by this acid treatment is then washed completely free from soluble salts preferably by the use of cold water.

The molecular weight of the product resulting from the above treatment is found to vary between 4000 and 5000 determined cryoscopically by solution in benzene and to have a molecular size of between 25 and 30 units, whereas the molecular weight of the polymer prior to the splitting treatment just described was too high to be quantitatively determined by any of the ordinary methods known to the chemist for determining molecular weight. The molecular weight of that polymer may be estimated at between 100,000 and 200,000. The product produced by the splitting has the formula HSRSSR ... SSRSH from which it will be seen that it is essentially an organic polythiopolymercaptan.

*Process B*

Production of a polymer having a lower molecular weight than that produced by Process A can be achieved by proceeding as in Process A down to the point where the splitting or dismemberment steps are described and then proceeding as follows:

In the instant process the splitting is carried out by the addition to the washed latex of 1.6 lb. mols of sodium hydrosulfide (NaSH) and 4.4 lb. mols of anhydrous sodium sulfite (Na₂SO₃). The latex containing the splitting salts is heated with considerable agitation for a period of one hour at a temperature of 180° F. The split latex is acidified directly with acetic acid without intermediate washing and the final pH of the liquid is adjusted to 4–5, after which the semi-liquid reaction polymer is washed by settling and decanting with successive changes of water until substantially free from soluble salts.

The product thus obtained is a liquid or flowable product at normal temperatures, e. g., about 70° F., this also being true of the polymer produced in Process A, and the characteristics of these two polymers are similar except that the viscosity of the polymer of Process B is less than that of Process A. The molecular weight of the product of Process B is approximately 1200, corresponding to from 7–8 units.

In Processes A and B a high molecular weight polymer is first made and is then split at —SS— linkages to produce segments having terminal —SH groups. In these particular processes linear polymers are specifically described. However, it will be clear that the invention is not limited to the use of linear polymers and that the polymers used are fully coextensive with the generic definition thereof set forth above.

In the above Processes A and B, dichlorodiethyl formal is merely one of a large number of dihalogenated compounds that may be used. Such compounds lead to the formation of linear polymers. By using a compound having three or more halogen atoms in conjunction with a compound having only two halogen atoms, a polymer having cross linkage is obtained, the extent of cross linkage depending on the ratio of polyhalogen to dihalogen compounds. This ratio may be as small as 0.01 molar per cent or as high as 10 to 20 molar per cent or higher. When a compound having three or more halogen atoms is used exclusively, then the density of cross linkage is at a maximum.

The polysulfide polymers having at least two SH groups and a scope and definition as above described may be obtained by methods other than those illustrated in Processes A and B, although the splitting technique there illustrated is the preferable method. It provides a close control of molecular size of the product. For example, polymers may be obtained having an average molecular size of about 500 to 15000 and having at least two SH groups and such polymers are well adapted for reaction with a compound having the formula R'SSR', although the invention in its generic aspects is not limited to the use of polymers having a particular range of molecular weight.

In order to point out more fully the nature of the present invention the following specific examples are given of illustrative methods of carrying out the invention.

*Example 1*

This example will illustrate the preparation of a material having as a repeating unit the group $-SCH_2CH_2OCH_2OCH_2CH_2S-$ with hydroxyl terminals and with an average molecular size of ten units. As a starting material, a polymer made as in Process A or B may be used. As stated above the exact molecular size of the starting polymer has no bearing on the molecular size of the final product. The molecular size after oxidation is controlled solely by the ratio of mols of monomeric disulfide to mols of the $-SRS-$ unit of the dimercaptan polymer.

To one unit mol of the polymeric dimercaptan produced by Process A, i. e. 166 grams there is added $\frac{1}{10}$ mol of bis (2-hydroxy-ethyl) disulfide. As each molecule of product after oxidation needs two terminals one molecule of the disulfide will supply the terminals for one molecule of product. As the ratio of mols of disulfide to the unit mol of $-SRS-$ is $\frac{1}{10}$, we therefore have 10 mols of $-SRS-$ per mol of disulfide. The molecular size of the final product is therefore 10 units of $-SRS-$ terminated at each end by an $SC_2H_4OH$ group.

The mixture is heated for one to four hours at 100° C. to insure complete reaction. The reaction product is then oxidized to remove all mercaptan groups by bubbling air through the reaction mixture for ten hours at 100° C., the air being first bubbled through ammonium hydroxide.

The product is a viscous liquid having a molecular weight of 3000 to 4000. Titration of the product with iodine solution shows it has a negligible amount of mercaptan terminals. Acetylation by the standard method using acetic anhydride and pyridine showed the hydroxyl groups to be present in the correct proportion and molecular weight determinations using the cryoscopic method in benzene corresponded closely to the predicted size of ten $-SRS-$ units.

*Example 2*

As a starting material use a dimercaptan polymer prepared as in Process A except that dichlorodiethyl ether is used in place of dichlorodiethyl formal in the actual polymer preparation. To get a product with an average molecular size of twenty units use one unit mol of dimercaptan, i. e. 136 g. and add $\frac{1}{20}$ mol of dithiodiglycollic acid. The mixture is heated for one to four hours at 100° C. to insure complete reaction. The reaction product is then oxidized to transform all mercaptan terminals to disulfide linkages by heating with 13.6 grams of tertiary butyl hydroperoxide for two hours.

The product is a viscous liquid. Titration of the product with iodine solution shows it has a negligible amount of mercaptan groups. Molecular weight determinations using the cryoscopic method with benzene as solvent correspond closely to the predicted twenty units of the dimercaptan.

*Example 3*

Proceed as in Example 1 substituting di(2 hydroxybutene 3) disulfide for the di(hydroxyethyl) disulfide in the same molecular ratio.

*Example 4*

Proceed as in Example 1, substituting diallyl disulfide for the di(hydroxyethyl) disulfide in the same molecular ratio.

*Example 5*

Proceed as in Example 2 substituting bis-(paranitrophenyl) disulfide for the di thiodiglycollic acid in the same molecular ratio.

*Example 6*

Proceed as in Example 2 substituting bis (2, 4 dinitrophenyl) disulfide for the dithioglycollic acid in the same molecular ratio.

*Example 7*

Proceed as in Example 2 substituting for the dithioglycollic acid 10 grams of compound (j) listed in Table I above.

*Example 8*

Proceed as in Example 2 substituting for the dithioglycollic acid 10 grams of di(para aminophenyl) disulfide.

*Example 9*

Proceed as in Example 1 substituting di(4-ketopentane) disulfide for the di(hydroxyethyl) disulfide in the same molecular ratio.

In each of Examples 1 to 9 the product is a viscous liquid. Also in each of these examples there may be substituted for the dimercaptan of that example any dimercaptan having the formula $H(SRS)pH$ where $p$ varies from 1 to 1000, e. g. any of the dimercaptans listed in Table II. In each case the weight of dimercaptan taken will be such as to provide a molar weight of the $-SRS-$ unit thereof equal to the molar weight of said unit set forth in said examples, i. e. one molecular weight of the unit $-SRS-$.

*Example 10*

Production of a product composed of $RS_3$ units and carboxyl terminals.

Heat 137 grams of a product having the formula

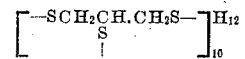

i. e. one gram molecular weight of said unit

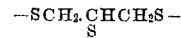

with $\frac{11}{20}$ of a mol (100 g.) of dithiodiglycollic acid at 150° C. for 6 to 8 hours. Then oxidize by blowing with air until the test for $-SH$ groups is negative.

The product is a viscous liquid having the formula

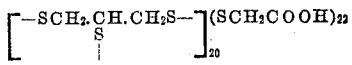

In Example 10 there may be substituted any of the products listed in Table III using the same molecular proportions of the unit RS₃ and a monomeric organic disulfide having the general formula R'SSR'.

*Example 11*

Proceed as in Example 1 down to the oxidation step. Then thoroughly mix with the reaction product 23.9 grams of lead peroxide. This quantity of lead peroxide represents an excess of about 50% over that theoretically required to oxidize the mercapto groups present.

The oxidized product has a viscosity slightly greater than that of the product before oxidation, but is still a viscous liquid and has a molecular weight of around 3000 to 4000.

*Example 12*

Proceed as in Example 11 but substitute for the lead peroxide 7 grams of paraquinonedioxime and 3 grams of diphenyl guanidine. The product is similar to that of Example 11.

*Example 13*

Proceed as in Example 11 but substitute for the lead peroxide 4.8 grams of sulfur. This will result in the evolution of some hydrogen sulfide which may give a temporary softening if it is not completely eliminated during milling. If, however, the hydrogen sulfide is completely eliminated, the product will have a molecular weight mainly in the range 3000 to 4000.

*Example 14*

Proceed as in Example 11 but substitute for the lead peroxide 1 gram of diphenyl guanidine and 10 grams of cumene hydroperoxide in the form of a 70% solution. The product is similar to that of Example 11.

The unoxidized reaction product of Example 1 can also be oxidized by the following reagents in the amounts indicated:

| | Grams |
|---|---|
| 30% hydrogen peroxide | 15 |
| Sodium hypochlorite in aqueous solution | 11.8 |
| Potassium persulfate in aqueous solution | 40.5 |
| Iodine in aqueous solution | 18.9 |
| Sulfur | 4.8 |

The product obtained by oxidation with any of the above materials will be substantially the same as that obtained in Example 1. In the case of iodine oxidation, the acidity of the solution may have to be controlled by use of sodium carbonate to prevent the hydriodic acid formed from attacking the formal links.

I claim:

1. Process which comprises reacting an organic polymercapto compound characterized by the unit RS_q where R is a radical having skeleton carbon structure selected from the group consisting of

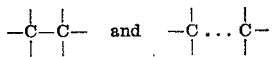

representing adjacent carbon atoms and carbon atoms separated by and joined to intervening structure respectively, $q$ is one of the integers 2, 3 and 4, and S is a sulfur atom, each of said sulfur atoms being connected to a different carbon atom of said radical, with an organic monomeric disulfide having the formula R'SSR', where R' is an organic monovalent radical, at temperatures between 25° C. and 250° C. and oxidizing the reaction product to convert substantially all mercapto groups to disulfide linkages, to obtain a product having the formula $$(RS_q)_n(SR')_{n(q-2)+2}$$

where $n$ is an integer varying from 1 to 1000 and equals the desired average number of RS_q units in the product, the mol ratio of said monomeric disulfide to said RS_q unit being $$\frac{n(q-2)+2}{2n}$$

said monomeric disulfide having a disulfide linkage wherein each sulfur atom is connected to a carbon atom and each of the carbon atoms connected to the disulfide linkage is otherwise connected only to atoms of the group consisting of carbon and hydrogen atoms.

2. Process which comprises reacting an organic polymercapto compound characterized by the unit RS₂ where R is a radical having skeleton carbon structure selected from the group consisting of

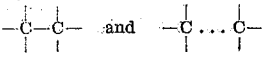

representing adjacent carbon atoms and carbon atoms separated by and joined to intervening structure respectively, and S is a sulfur atom, each of said sulfur atoms being connected to a different carbon atom of said radical, with an organic monomeric disulfide having the formula R'SSR' where R' is an organic monovalent radical, at temperatures between 25° C. and 250° C. and oxidizing the reaction product to convert substantially all mercapto groups to disulfide linkages to obtain a product having the formula $(RS_2)_n(SR')_2$ where $n$ is an integer varying from 1 to 1000 and equals the desired average number of RS₂ units in the product, the mol ratio of said monomeric disulfide to said RS₂ unit being $1/n$, said monomeric disulfide having a disulfide linkage wherein each sulfur atom is connected to a carbon atom and each of the carbon atoms connected to the disulfide linkage is otherwise connected only to atoms of the group consisting of carbon and hydrogen atoms.

3. Process which comprises reacting an organic polymercapto compound characterized by the unit RS₃ where R is a radical having skeleton carbon structure selected from the group

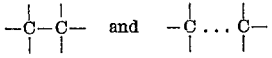

representing adjacent carbon atoms and carbon atoms separated by and joined to intervening structure respectively, and S is a sulfur atom, each of said sulfur atoms being connected to a different carbon atom of said radical, with an organic monomeric disulfide having the formula R'SSR' where R' is an organic monovalent radical, at temperatures between 25° C. and 250° C. and oxidizing the reaction product to convert substantially all mercapto groups to disulfide linkages to obtain a product having the formula $(RS_3)_n(SR')_{n+2}$ where $n$ is an integer varying from 1 to 1000 and equals the desired average number of RS₃ units in the product, the mol ratio of said monomeric disulfide to said RS₃ unit being $$\frac{n+2}{2n}$$

said monomeric disulfide having a disulfide linkage wherein each sulfur atom is connected to a carbon atom and each of the carbon atoms connected to the disulfide linkage is otherwise connected only to atoms of the group consisting of carbon and hydrogen atoms.

4. Process which comprises reacting an organic polymercapto compound characterized by the unit RS₄ where R is a radical having skeleton carbon structure selected from the group consisting of

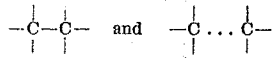

representing adjacent carbon atoms and carbon atoms separated by and joined to intervening structure respectively, and S is a sulfur atom each of said sulfur atoms being connected to a different carbon atom of said radical, with an organic monomeric disulfide having the formula R'SSR' where R' is an organic monovalent radical at temperatures between 25° C. and 250° C. and oxidizing the reaction product to convert substantially all mercapto groups to disulfide linkages to obtain a product having the formula $(RS_4)_n(SR')_{2n+2}$ where $n$ is an integer varying from 1 to 1000 and equals the desired average number of RS₄ units in the product the mol ratio of said monomeric disulfide to said RS₄ unit being $$\frac{n+1}{n}$$

said monomeric disulfide having a disulfide linkage wherein each sulfur atom is connected to a carbon atom and each of the carbon atoms connected to the disulfide linkage is otherwise connected only to atoms of the group consisting of carbon and hydrogen atoms.

5. Process which comprises reacting an organic polymercapto compound characterized by the unit RS₂ where R is a radical having skeleton carbon structure selected from the group consisting of

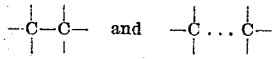

representing adjacent carbon atoms and carbon atoms separated by and joined to intervening structure respectively, and S is a sulfur atom, each of said sulfur atoms being connected to a different carbon atom of said radical with bis (2, 4 dinitrophenyl) disulfide at a temperature of 25° C. to 250° C. and oxidizing the reaction product to convert substantially all mercapto groups to disulfide linkages to obtain a product having the formula

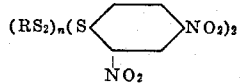

where $n$ is an integer varying from 1 to 1000 and equals the desired average number of RS₂ units, the mol ratio of said disulfide to said RS₂ unit being $1/n$.

References Cited in the file of this patent

UNITED STATES PATENTS

| Number | Name | Date |
|---|---|---|
| 2,142,145 | Patrick | Jan. 3, 1939 |
| 2,195,380 | Patrick | Mar. 26, 1940 |
| 2,363,614 | Patrick | Nov. 28, 1944 |
| 2,429,698 | Schneider | Oct. 28, 1947 |
| 2,606,173 | Fettes | Aug. 5, 1952 |

OTHER REFERENCES

Chizallet Revue Generale Du Cauotchouc, November 1946, pages 277–284.